(12) United States Patent
He et al.

(10) Patent No.: US 7,356,010 B2
(45) Date of Patent: Apr. 8, 2008

(54) POINT COORDINATOR CONTROL PASSING SCHEME USING A SCHEDULING INFORMATION PARAMETER SET FOR AN IEEE 802.11 WIRELESS LOCAL AREA NETWORK

(75) Inventors: Xiaoning He, Sunnyvale, CA (US); Daichi Funato, Mountain View, CA (US)

(73) Assignee: NTT DoCoMo Inc., Tokyo (JP)

( * ) Notice: Subject to any disclaimer, the term of this patent is extended or adjusted under 35 U.S.C. 154(b) by 1170 days.

(21) Appl. No.: 10/307,701

(22) Filed: Dec. 2, 2002

(65) Prior Publication Data
US 2004/0105412 A1    Jun. 3, 2004

(51) Int. Cl.
*H04Q 7/24* (2006.01)
*H04Q 7/20* (2006.01)
*H04L 12/403* (2006.01)

(52) U.S. Cl. .............. 370/338; 370/449; 455/426.1

(58) Field of Classification Search ............ 455/426.1, 455/426.2, 41.1, 444; 370/338, 449
See application file for complete search history.

(56) References Cited

U.S. PATENT DOCUMENTS

| | | | | |
|---|---|---|---|---|
| 5,805,579 | A * | 9/1998 | Erving et al. | 370/320 |
| 5,815,527 | A * | 9/1998 | Erving et al. | 375/140 |
| 5,878,037 | A * | 3/1999 | Sherman | 370/335 |
| 5,995,497 | A * | 11/1999 | Gerakoulis | 370/320 |
| 6,850,981 | B1 * | 2/2005 | Ho et al. | 709/227 |
| 2006/0052088 | A1 * | 3/2006 | Pavon et al. | 455/414.1 |

OTHER PUBLICATIONS

Malathi Veeraraghavan, Nabeel Cocker, & Tim Moors, *Support of Voice Services in IEEE 802.11 wireless LANs*, IEEE INFOCOM 2001, 488-497 (2001).
Lan Man Standard committee of the IEEE Computer Society, Information Technology—Telecommunications and Information Exchange Between Systems—Local and Metropolitan Area Networks—Specific Requirements—Part 11: Wireless LAN Medium Access Control (MAC) and Physical Layer (PHY) Specification, ISO/IEC 8802-11 ANSI/IEE Standard 802.11 First Edition 1999-00-00, 1-511 (1999).

* cited by examiner

*Primary Examiner*—Tilahun Gesesse
(74) *Attorney, Agent, or Firm*—Edward C. Kwok; MacPherson Kwok Chen & Heid LLP (57) ABSTRACT

A communications protocol in a system such as an IEEE 802.11 wireless LAN multi-hop system providing transmission scheduling information is disclosed. The transmission scheduling is formatted within a CF–Poll+Data+SIPS data frame transmitted by the point coordinator (PC) which may be any one of the access point (AP) nodes transmitting in turn as dictated by the scheduling parameters within the scheduling information parameter set (SIPS). The SIPS comprises an offset field, the time left for the presently functioning PC; a delay field, where an AP delays functioning as a PC; and the interval field, the time allowed for an AP to function as a PC. The subsequent scheduling of assigned transmission slots by providing boundaries for the transmission frames through SIPS eliminates collisions resulting from multiple units transmitting simultaneously, thereby supporting interactive media and voice communications on WLAN multi-hop systems.

22 Claims, 12 Drawing Sheets

POINT COORDINATOR CONTROL PASSING SCHEME USING A SCHEDULING INFORMATION PARAMETER SET FOR AN IEEE 802.11 WIRELESS LOCAL AREA NETWORK

BACKGROUND

With the recent development of wireless networking, communication systems based on the Institute of Electrical and Electronic Engineering (IEEE) 802.11 wireless local area network (WLAN) standard have become very popular. The IEEE society, a professional organization, has formulated and promulgated standards, through its standards committees, that are recognized internationally for providing commercial efficiency for communication, power, computing and many other systems that require a set procedure for the effective and efficient use of the systems among several different entities. In this particular case, the standards referred to provide one definitive protocol for all equipment vendors so that the communication equipment from the various manufacturers will interface with one another in the wireless local area network, such as the systems illustrated in FIGS. 1 and 2. Data standards referred to herein may be found in the IEEE 802.11 WLAN standards.

While the data service based on WLAN is extensive, the commercial usage of WLAN to support real-time interactive multimedia service is rare. This is primarily due to the fact that a very high percentage of the currently available IEEE 802.11 cards on the market implement only the contention-based medium access control (MAC) layer mode, i.e. the distributed coordination function (DCF), defined by the IEEE 802.11 standard. As described later, the DCF mode cannot be used to support the real-time application. The IEEE has been aware of this problem, and as a result, they have provided for a polling based MAC layer operational mode for the IEEE 802.11 standard, namely the point coordination function (PCF).

IEEE 802.11 is a standard access technology defined by the IEEE 802.11 working group. The standard 802.11 WLAN supports two structures, the infrastructure mode and the ad-hoc mode. In the infrastructure mode as described in FIG. 2, all data from the Mobile Terminals (MT) h will be sent to an Access Point (AP) a, b, c, d, e, f, and g and the receiving AP will subsequently send the packets to the proper destination. In the ad-hoc mode, the MTs h will directly communicate with each other.

The IEEE 802.11 standard also supports three different physical layer schemes. They are the Frequency Hopping Spread Spectrum (FHSS), the Direct Sequence Spread Spectrum (DSSS) and the Infrared (IR). With the different physical layer technologies mentioned above, up to 11 Mbps is supported. In order to further increase the data rate, the IEEE 802.11a extension is standardized. IEEE 802.11a uses the Orthogonal Frequency Divided Multiplexing (OFDM) as its physical layer modulation scheme supporting a 54 Mbps data rate. Despite the differences between the physical layers, the IEEE 802.11 uses a common MAC layer standard. Therefore, this formatted message frame is the standard in the above IEEE 802.11 physical layer schemes. In this 802.11 MAC standard, two operational modes are supported, the DCF mode and the PCF mode.

Figure 3:
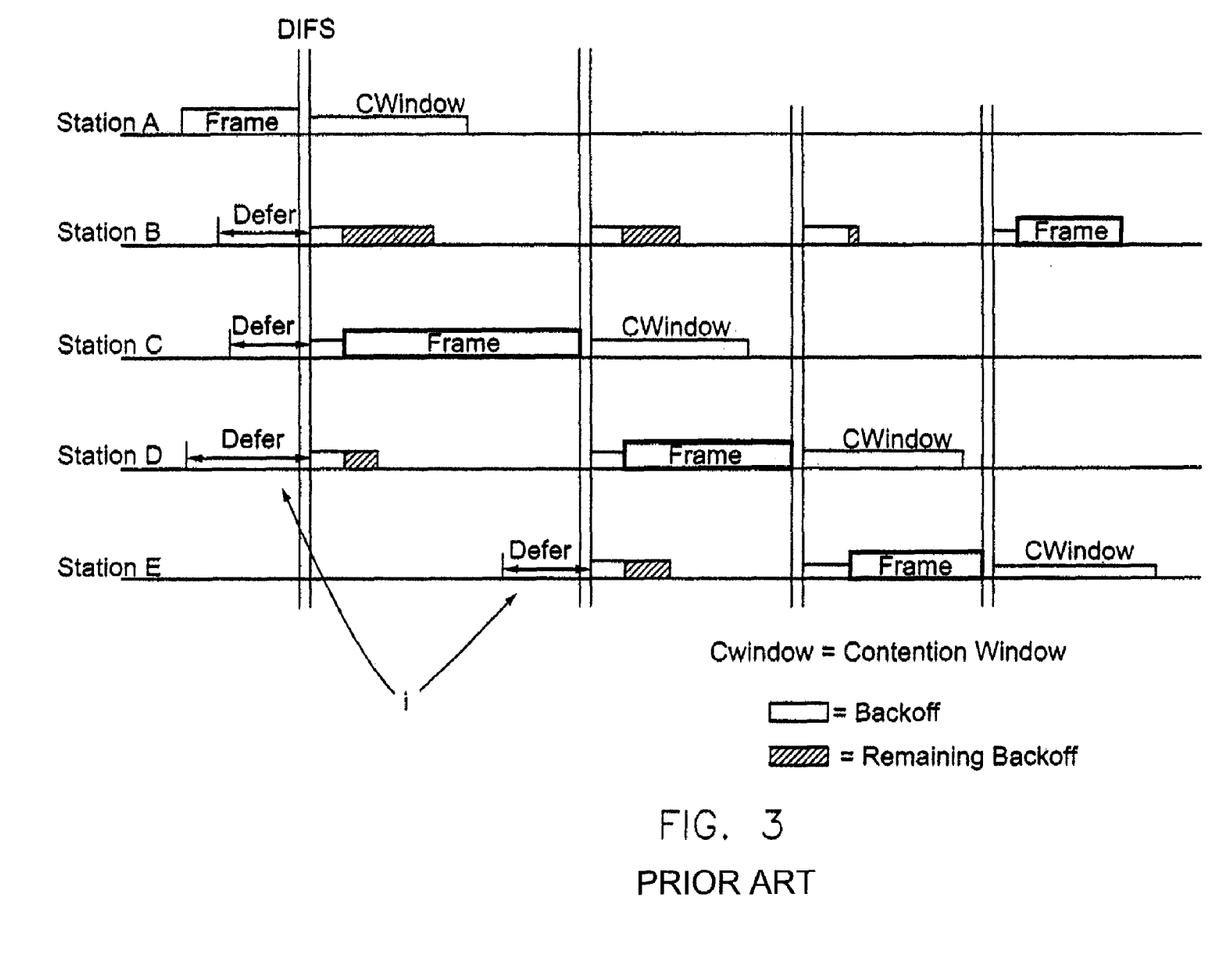
FIG. 3 is a time sequence diagram of the transmission frames in a contention-based communications protocol.

As shown in FIG. 3, the DCF mode is a contention based operational mode. A Carrier Sense Multiple Access with Collision Avoidance (CSMA/CA) mechanism is used within the DCF mode. When a MT h wants to send data, it monitors the wireless channel. If the channel is free, instead of immediately transmitting the data, the MT h will delay for a short period known as the DCF Interframe Space (DIFS) i. After the MT h has delayed for a DIFS period i, the MT h monitors the channel once again. Only if the channel is free will the MT h transmit the packet. On the other hand, if the channel is busy, the MT h will back-off for a random period of time before attempting to transmit again. Since each MT h competes for the medium, the DCF mode is called a contention-based operational mode. FIG. 3 makes clear that the MTs h operating in the DCF mode transmit randomly. As a result, no systematic frame boundaries are defined for the MTs h using the DCF mode, and the jitter between two sequential data frames cannot be predicted. Hence, this makes the DCF mode inherently unsuitable for a reliable multimedia service.

Figure 4:
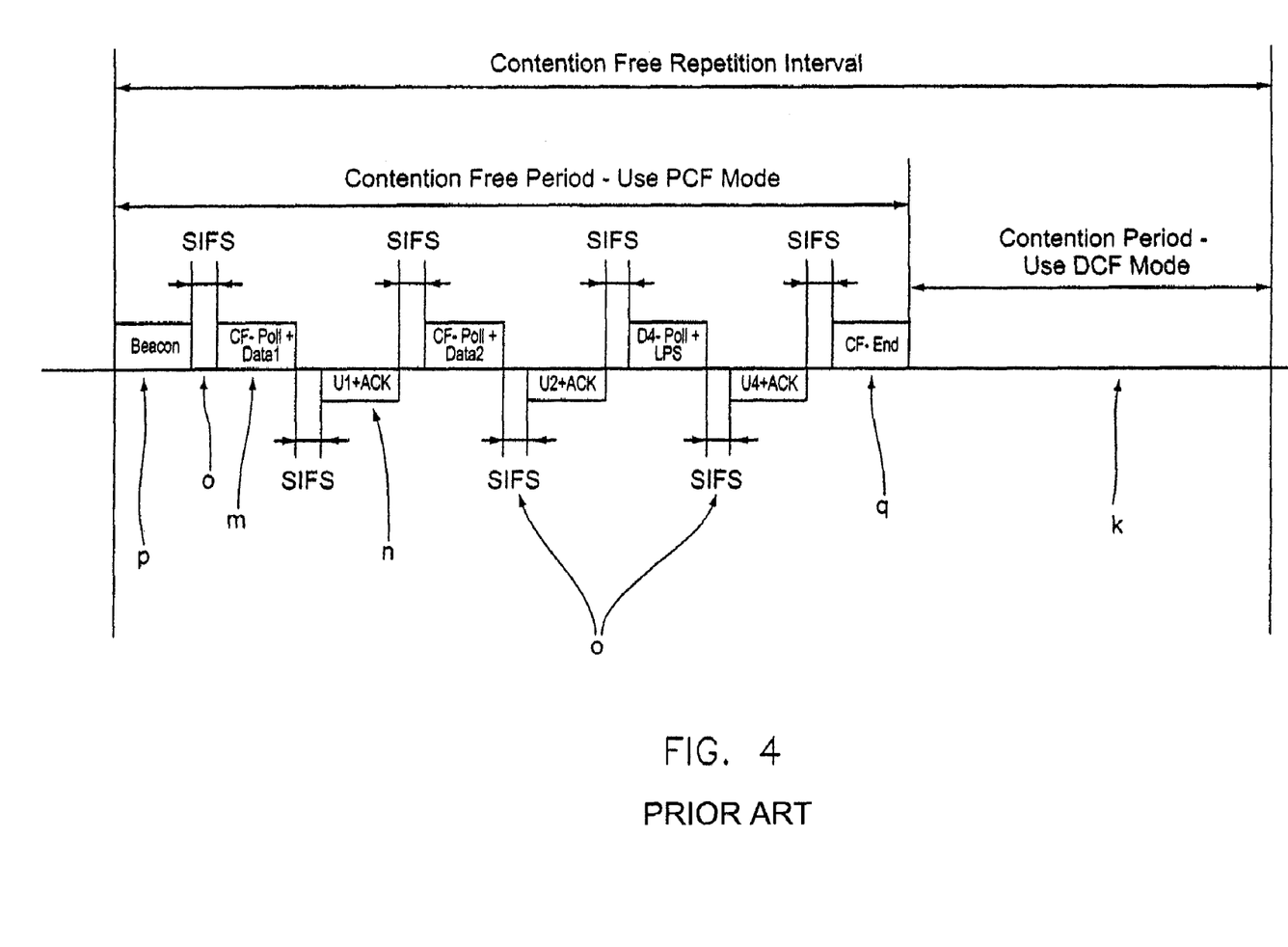
FIG. 4 shows a data communication frame for digital communications formatted for a point coordination function mode illustrating the contention free period and the follow-on contention period in the communication frame.
Figure 5:
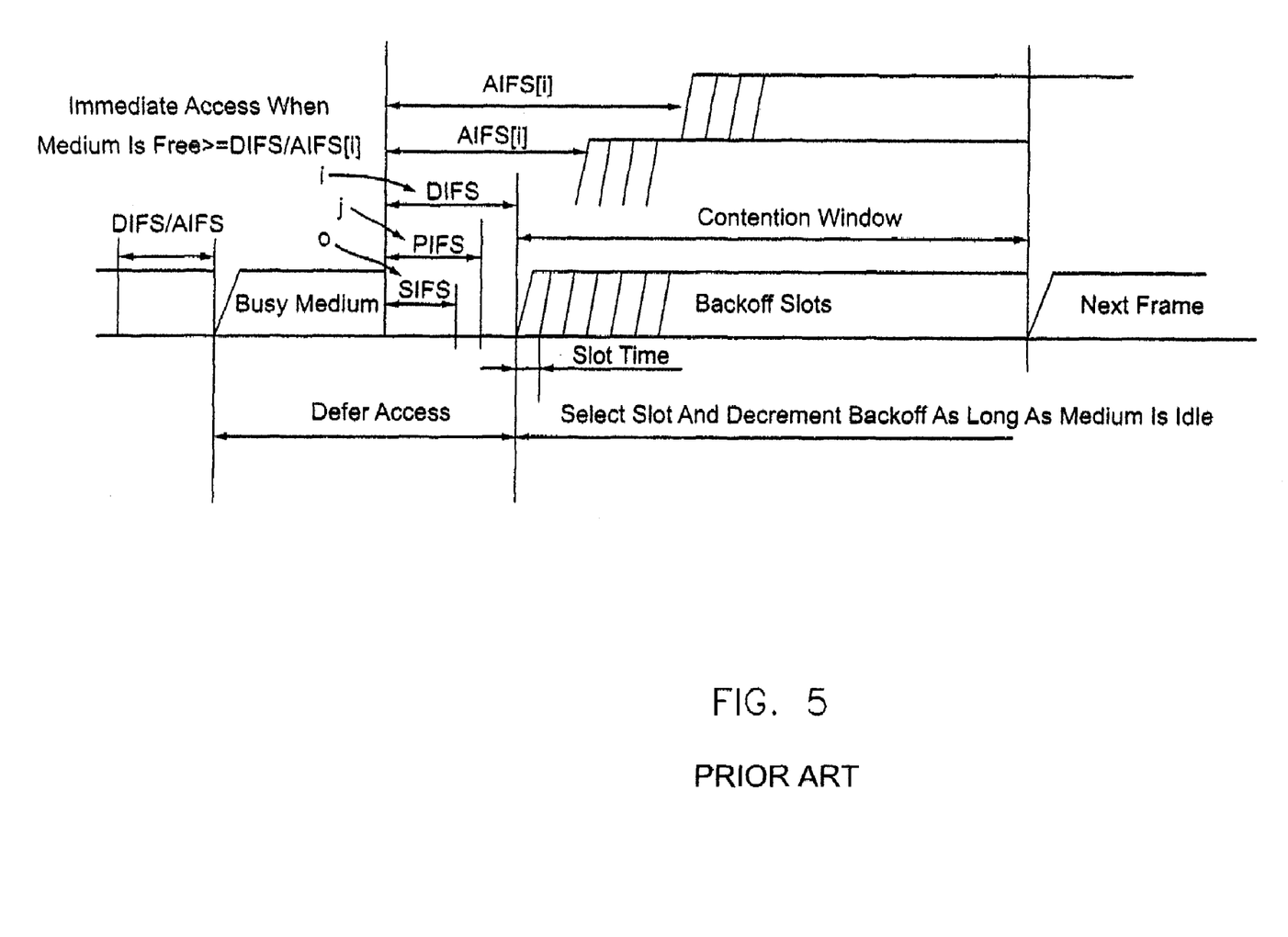
FIG. 5 is the timing delay diagram illustrating the different delays that occur following the end of a transmission in the DCF operational mode.
Figure 6:
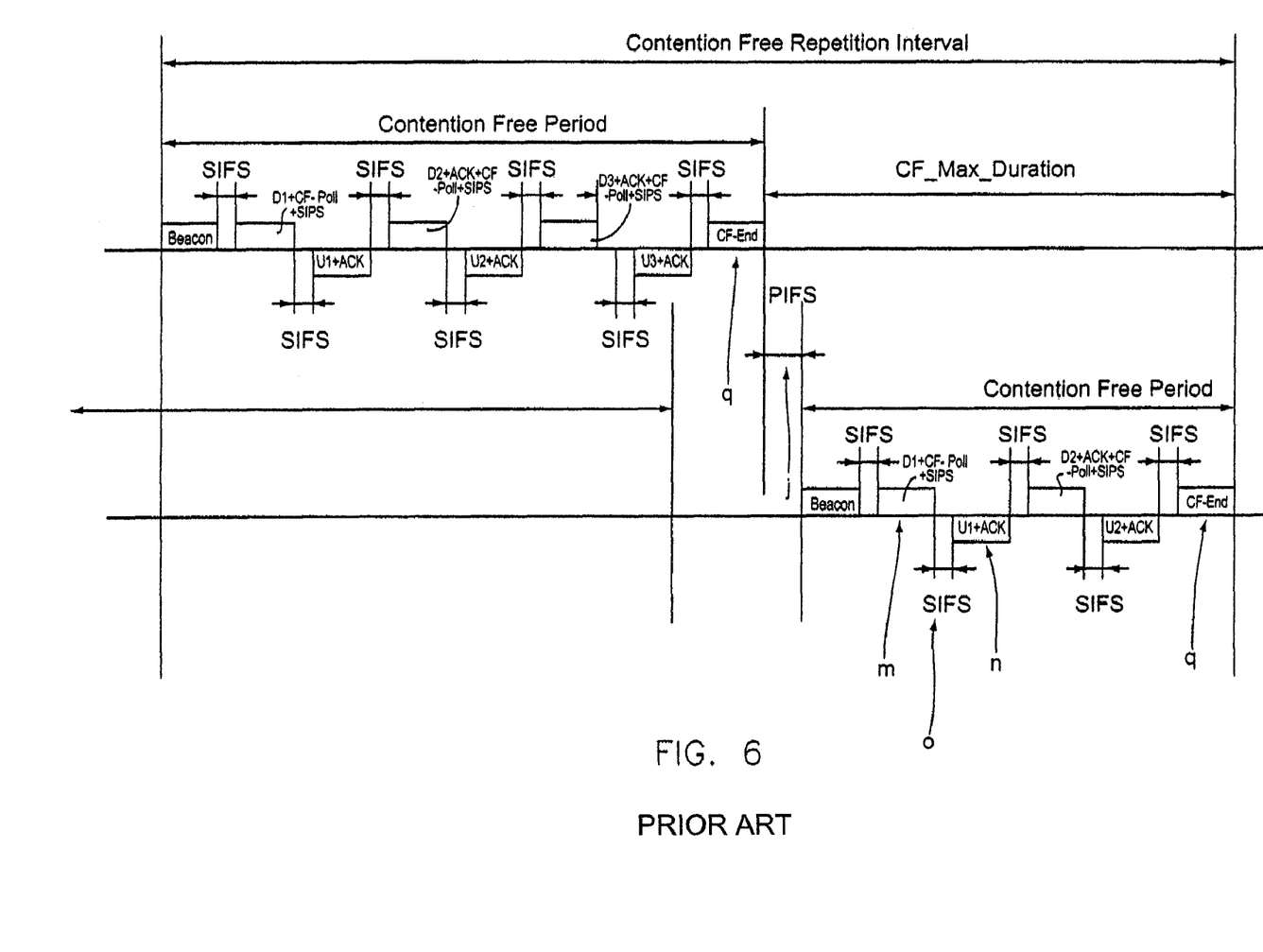
FIG. 6 is a repetitive contention-free frame resulting from the scheduling information parameter set.

In order to support a delay sensitive application such as voice, the IEEE 802.11 standard provides another MAC layer operation mode, the PCF mode. FIG. 4 illustrates a contention free period where the PCF, a polling based operation mode, is utilized. Before any AP transmits data, the AP will monitor the assigned channel for other ongoing communications. If the channel is free, similar to DCF, the AP will delay for a short period of time known as the PCF Interframe Space (PIFS) j as shown in FIG. 5. Since a PIFS time period j is shorter than a DIFS i, an AP operating in the PCF mode, will transmit before the time elapses for any of the DCF devices, thereby securing the transmission slot. The period when the PCF operates is known as the Contention-Free Period (CFP) and it is configurable using the CF_Max_Duration parameter defined by the IEEE standard. Each AP will generate the CFP at a fixed rate known as the Contention-Free Repetition Rate (CFPRate). From the end of the current CFP to the beginning of the next CFP, the AP will operate in the DCF mode. This period is called the CP (Contention Period) k and is illustrated in FIG. 4. The sum of the CFP and CP periods is called Contention Free Repetition Interval and is illustrated in FIG. 6. The Contention Free Repetition Interval is also known as a superframe.

Each AP maintains a polling list. During each CFP, the AP polls each member on the polling list at least once using the CF−Poll+Data m message frame. The MT who receives the CF−Poll+Data m message will transmit an acknowledgement and the reply data using the ACK+Data n message frame. The space between each data frame is the Short Interframe Space (SIFS) o, which is shorter than both the DIFS i and the PIFS j time periods as illustrated in FIG. 5. At the beginning of each CFP period, see FIGS. 4 and 6, a beacon p will be transmitted on an interval basis defined as Tb.

There are two ways to end a CFP period. The first is when the CF_Max_Duration time has elapsed. The second way to end the CFP period is when the AP transmits a CF_END q message after it has polled all the client members on the polling list. Since the PCF mode provides a connection-oriented service with these delay boundaries, it will support a multimedia service.

A multi-hop network is a type of wireless network whose nodes relay informational packets to other nodes that are out of the communication reach of the central node, from where the transmission process originates, in order to extend the coverage area of the network. The use of the IEEE 802.11 based multi-hop network has real world merits. For example, cell phone usage currently interferes with the medical equipment in hospitals, and subsequently cell phone usage is banned there. The 802.11 WLAN, on the other hand, does not interfere with medical equipment. Therefore, it would be meaningful to use the 802.11 WLAN to deliver voice service, and with the use of a multi-hop network, the coverage area could be extended. However, the simple use of the current PCF mode, standardized in the IEEE 802.11 standards, will not support voice service over such a multi-hop network. This topic is more thoroughly covered in the IEEE 802.11 WLAN standards. Accordingly, there is a need for an improved WLAN protocol that allows for improved multi-hop service.

BRIEF SUMMARY

Figure 1:
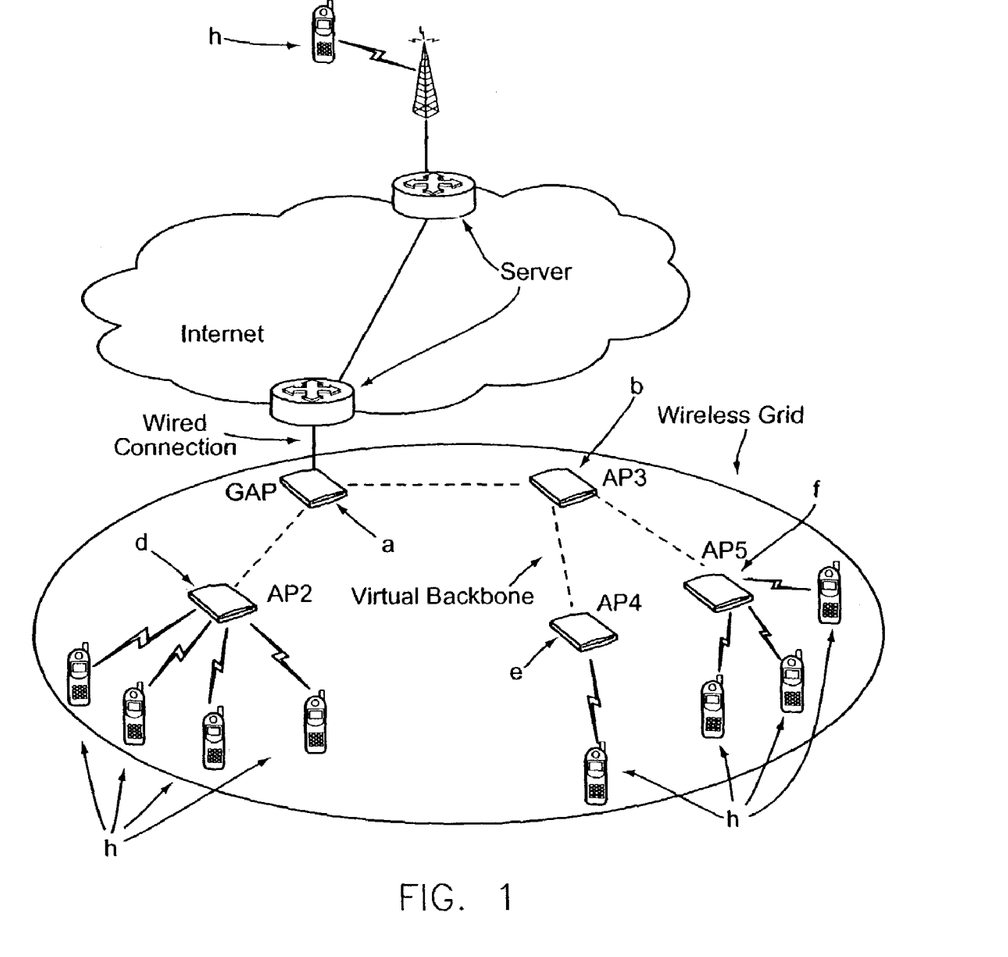
FIG. 1 illustrates a layout of an existing system architecture for a multi-hop wireless data communications system that will take advantage of the disclosed communication protocol.
Figure 2:
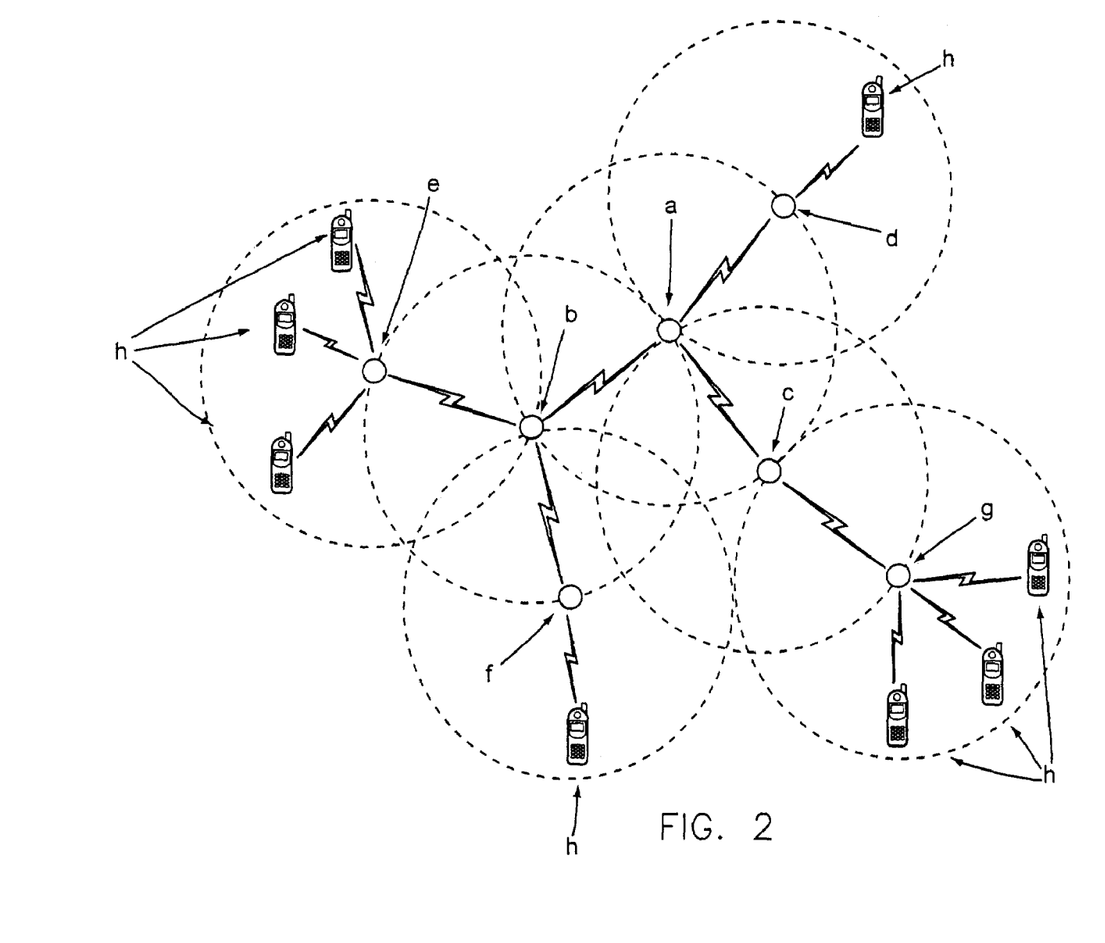
FIG. 2 shows another layout of an existing system for a multi-hop wireless data communications system that will take advantage of the disclosed communication protocol.

In order to address the drawbacks in the prior art, a communication transmission frame protocol and method are provided that are capable of avoiding transmission collisions or interference between APs and MTs such as those that are formatted for the IEEE 802.11 WLAN standard, and are designed to work with the systems illustrated in FIGS. 1 and 2. As described earlier, there is no way to avoid interference from competing transmissions between the APs, especially in a multi-hop WLAN, unless each AP transmits during a bounded period of time. With that time period properly bounded, the APs will function as a point coordinator (PC) for its clients without interference from other APs. According to an aspect of the invention, a new message frame primarily based on the 802.11 standard, but not limited to this standard, providing schedule and boundary information is disclosed, further enabling multi-hop real-time communications. The communication data frame provides a scheduling information parameter set (SIPS) within the overall message frame that defines the time boundaries when an AP will transmit information to client local access points (LAP) and MTs.

The boundaries formulated in the SIPS may include three different values that will set the time for an AP's transmission. The first of these values, the offset time, is the time for the APs who have the same depth with the currently transmitting AP, or PC, to complete the polling of its client LAPs. The second value formatted within the SIPS frame is the delay time and it elapses before the receiving LAP will operate as a PC to its clients. The final value, the interval time, is the amount of time that the receiving LAP may operate as a PC. With these parameters specified, the receiving LAP determines the boundaries in time that it will operate as a PC.

When all the LAPs know the time frame allotted to them, there should be no collisions or interference from other LAPs. This communication protocol improves upon contention free polling provided in the IEEE 802.11 WLAN standard because it includes scheduling information for the LAPs to transmit data and query its clients without competing for a time slot. Therefore, it readily finds its application in multi-hop wireless LANs for interactive medium and voice communications. For example, a cellular telephone communication network might operate as a multi-hop network in areas, such as mountainous regions or rugged terrain, where the stringing of communication cable or fiber may not be economically feasible. Other methods, systems, features and advantages of the invention will be, or will become, apparent to one with skill in the art upon examination of the following figures and detailed description.

BRIEF DESCRIPTION OF SEVERAL VIEWS OF THE DRAWINGS

The communication protocol can better be understood with reference to the following drawings and flow charts. The emphasis is placed upon illustrating the principles of the invention, therefore components shown in the drawings may not necessarily be to scale. In the drawings.

DETAILED DESCRIPTION OF THE PRESENTLY PREFERRED EMBODIMENT

A system utilizing the proposed communications data frame that is compatible with the IEEE 802.11 WLAN standard is shown in FIGS. 1 and 2. The gateway access point (GAP) a is the primary access point directly connected to the wired internet. The local access points (LAPs) b, c, d, e, f, and g are not connected to the wired internet but will network with the internet through the GAP a. Each LAP or node indicated in the system represents a transmitter and receiver capable of operating to the IEEE 802.11 WLAN standard on one channel.

Referring to FIG. 2, the GAP a is the access point directly connected to the wired internet. This specific embodiment forms a multi-hop network, where the system is organized as a tree structure. As an alternative, it is assumed that other configurations or variations to the network would be contemplated and would fall within the scope of the invention. As a result of this arrangement in the described embodiment, some LAPs may not be within range to directly communicate with the GAP a. Since some of the LAPs e, f and g may be a communication hop away from the GAP, the LAP in a given depth is assigned a depth number. The numbering begins with the GAP a being assigned 1. Thus, the depth of an adjacent LAP immediately downstream from the GAP a will be 2. Therefore, LAPs b, c, and d would be assigned a depth number of 2. They are the second LAPs from the GAP a. For any given LAP whose depth is 2, the most adjacent upstream LAP in this embodiment would be the GAP a for LAPs b, c, and d. The most adjacent downstream LAPs to LAP b would be LAPs e and f and they would be assigned a depth number of 3. It should be noted that in this embodiment, LAP c has only one downstream LAP g, and LAP d has no downstream LAPs. Therefore, in any tree structure such as the one illustrated in FIG. 2, any given LAP can have only one upstream LAP but may or may not have multiple downstream LAPs.

As noted earlier, only one AP may transmit at any one time, otherwise a collision between two or more transmitting units will occur. This is true because each unit has only one transmitter and one receiver and they both operate on a single channel. Since the PCF function occurs on a single channel, should two units perform the PCF at the same time and a collision occurs, the two units will always collide until the end of the PCF. Therefore, in this embodiment the role of the LAPs b, c, d, e, f, and g periodically changes between that of a PC and a LAP in order to provide a systematic method for transmitting interactive data and voice communications. Future embodiments may utilize multiple transmitters and receivers at the APs, thus eliminating the need to transmit on only one frequency band or channel. Future embodiments envisioning a transmitter capable of multi-channel transmissions is also anticipated and could also take advantage of this invention. Therefore, this protocol may be employed to further increase the bandwidth of the multi-hop system, utilizing bounded transmission slot among several channels.

In order to avoid the interference of competing transmissions, the LAPs delay transmitting for a predetermined period of time. With the delay properly scheduled, each LAP has a predetermined time within the communication frame when it will function as a PC. For this to happen, the LAPs b, c, d, e, f, and g are given various parameter values to determine their individual transmission. An arbitrary transmission sequence r for the APs such as that illustrated in FIG. 7 may result. Depending upon the requirements of the designer, other transmission sequences are possible and are contemplated by the disclosed invention.

Figure 8:
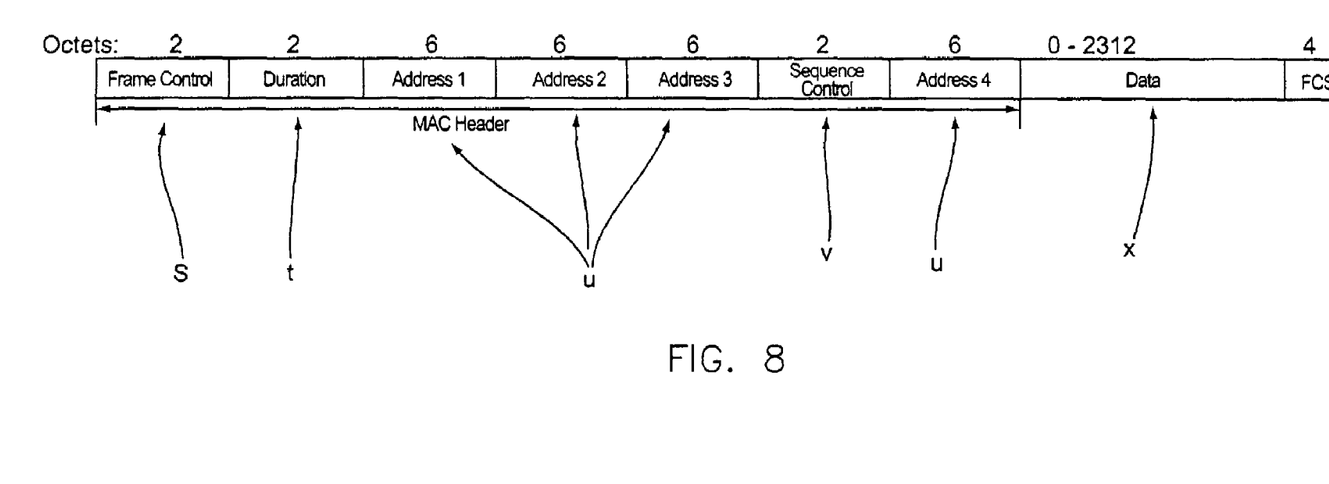
FIG. 8 is the "CF–Poll+Data" frame format currently utilized within the IEEE 802.11 standard.
Figure 9:
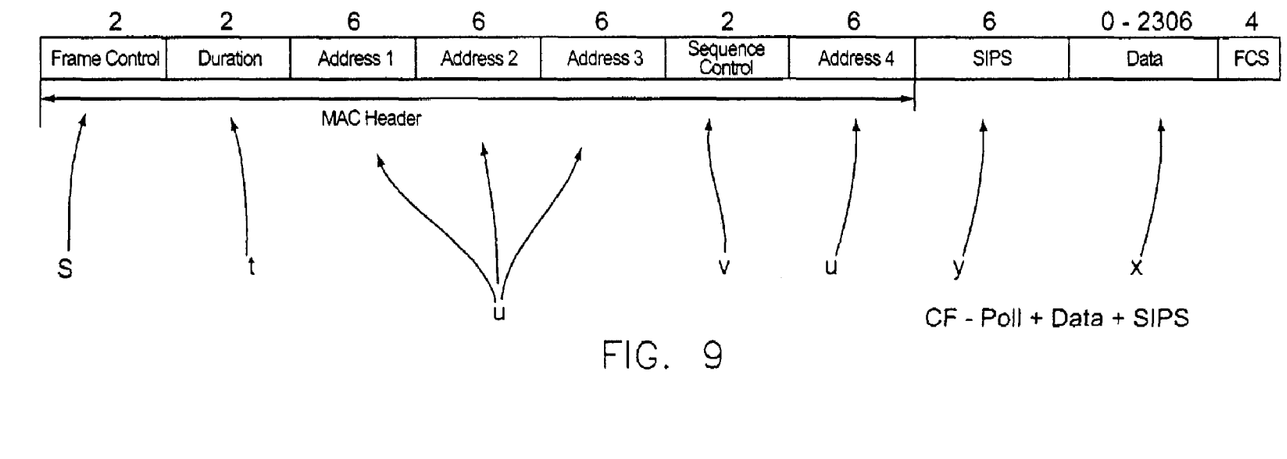
FIG. 9 is the format of the disclosed "CF–Poll+Data+SIPS" formatted message frame for use in the IEEE 802.11 standard for collision avoidance between transmitting APs.

In the existing IEEE 802.11 standard, the CF-Poll+Data m message is used to poll each client. This data frame is formatted as illustrated in FIG. 8. The data frame incorporates a MAC header that comprises a frame control block of s, a duration block t, a plurality of message destination blocks u, and a sequence control block v. Associated with and immediately following the header is the informational data x. Upon receipt at a client LAP, the LAP will reply and acknowledge n the query as in FIG. 4. However, since there is no provision for scheduling other transmission times for the client LAPs, the existing CF-Poll+Data m message frame is modified to include this information for use in a WLAN system. The new data frame disclosed is called "CF-Poll+Data+SIPS." It differs from the standard CF-Poll+Data m message frame, because this new frame contains a Scheduling Information Parameter Set (SIPS) y. The format for the CF-Poll+Data+SIPS formatted message is shown in FIG. 9.

Figure 10:
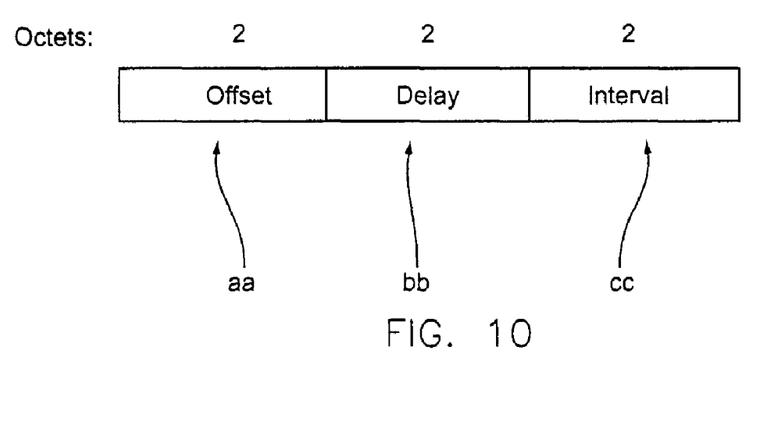
FIG. 10 is the disclosed format of the Scheduling Information Parameter Set to be used in the "CF–Poll+Data+SIPS" message frame.

The SIPS y portion of the above frame provides time boundary information for each of the LAPs b, c, d, e, f, and g, so each LAP will determine the time within the communication frame that it will function as the PC and for how long it will function in that role. There are three fields within the SIPS y that accomplish this goal as illustrated in FIG. 10.

The first field is the offset field aa and it indicates the time remaining for the upstream LAP to transmit all the remaining data to the same depth client LAPs. The second field, or the delay field bb, within the SIPS y field indicates the time the receiving LAPs will delay before transmitting after the upstream LAP has finished functioning as the PC. This includes the time necessary for the lateral LAPs who are first in line to communicate to their client APs. As in the present embodiment, LAP b should transmit first, then LAP c and finally LAP d. The third field, defined as the interval field cc, indicates the duration that a LAP will function as a PC. The LAP will set its CF_MAX_Duration equal to the time indicated in the interval field and the value is dependent upon the number of client LAPs that it will query.

Figure 7:
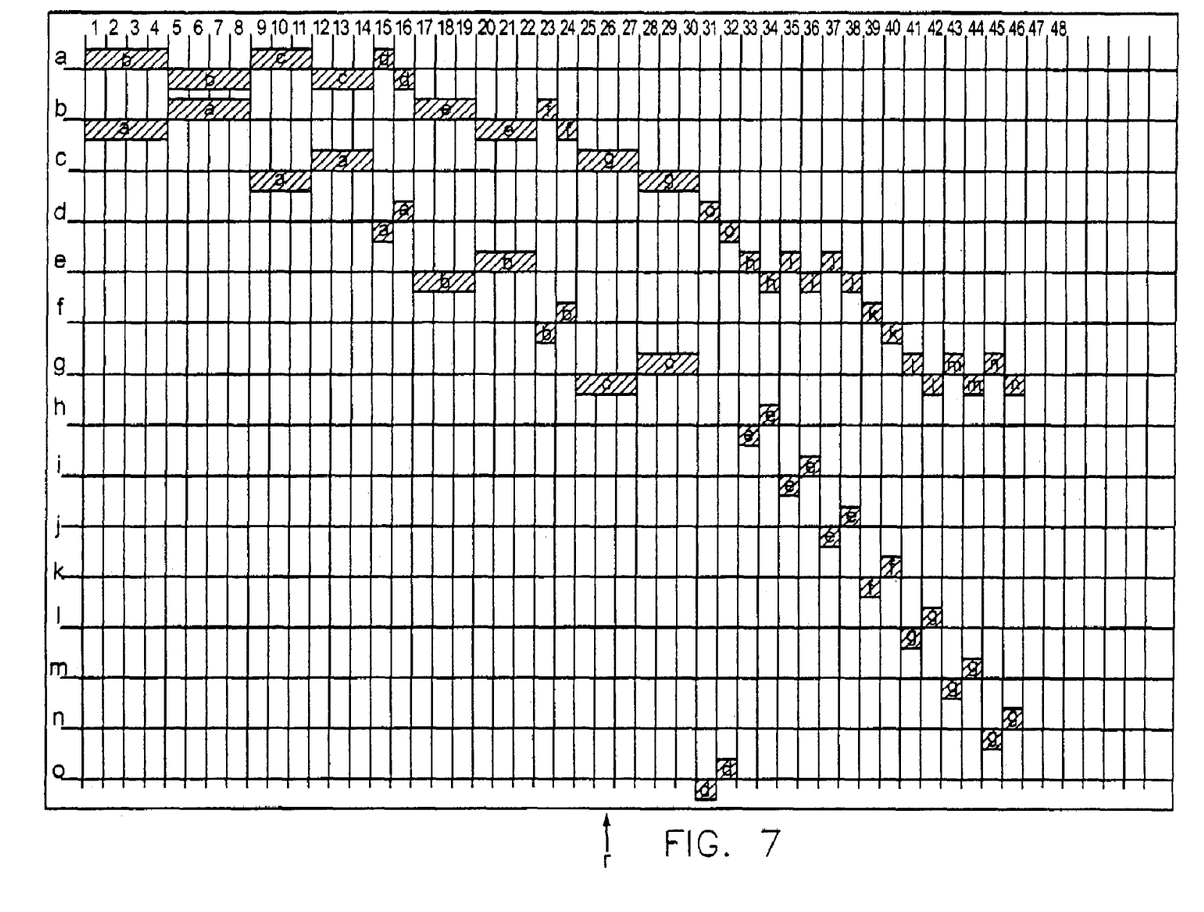
FIG. 7 is an embodiment of a scheduling chart of transmission slots for the APs in the multi-hop WLAN illustrated in FIG. 2.
Figure 11:
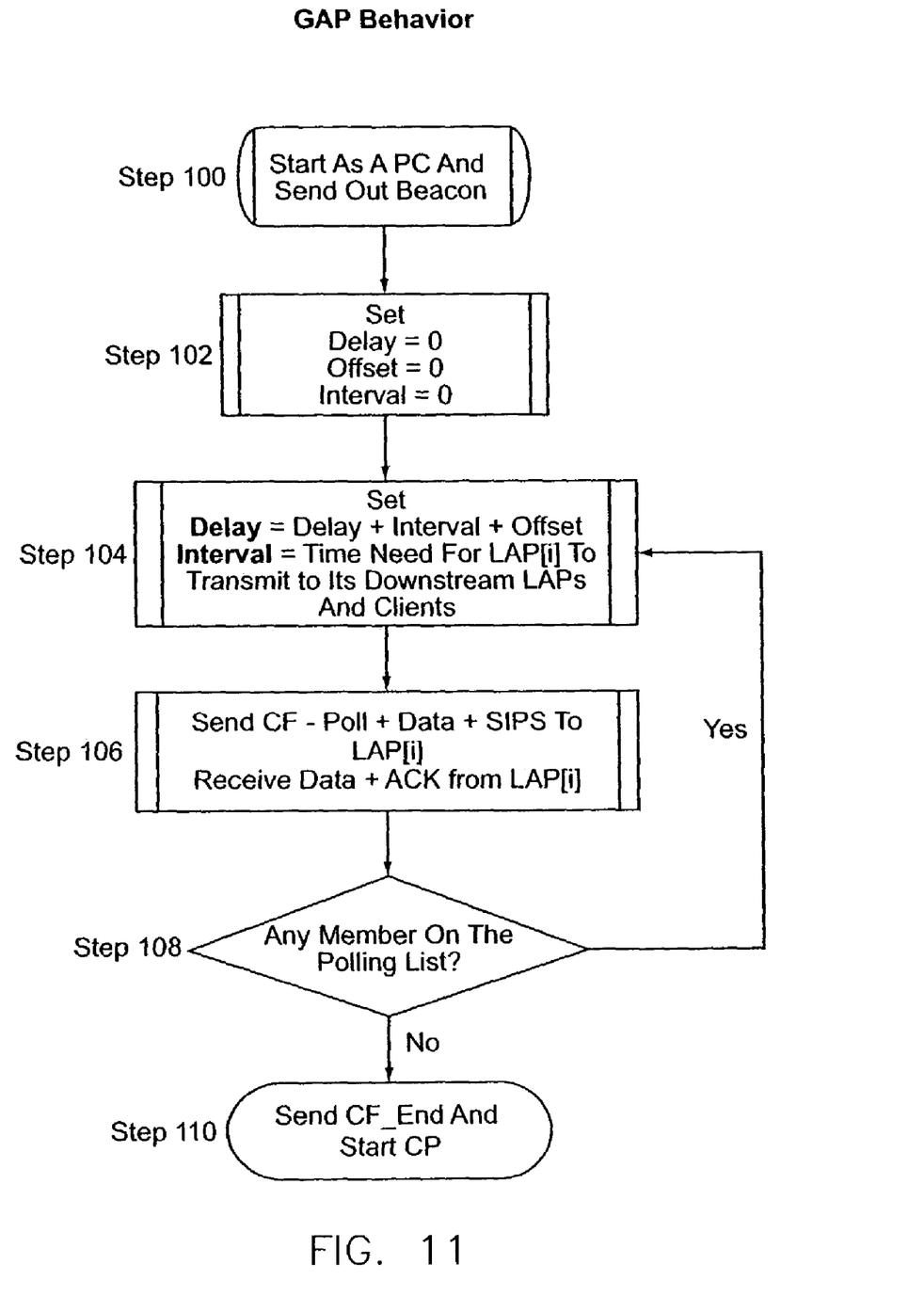
FIG. 11 is the flowchart for the communications protocol utilizing the "CF–Poll+Data+SIPS" message in the GAP as it functions as the PC.

In order to relay the data from the GAP a to the client LAPs b, c, d, e, f, and g, an arbitrary scheduling protocol as that illustrated in FIG. 7 is utilized. As long as all of the client LAPs are queried, it makes no difference in what order they are scheduled. Referring to FIG. 2, the GAP a will first serve as the PC and will transmit and receive data from its downstream LAPs b, c, and d. During this period, GAP's a downstream LAPs b, c, and d are clients to GAP a. Referring to the flowchart in FIG. 11, GAP a will begin by sending out a beacon message (Step 100) to alert the LAPs that it is functioning as the PC. After initializing the elements (the offset aa, delay bb and interval cc) of the SIPS y to zero (Step 102), the GAP a then sets the SIPS y data for the first receiving LAP (Step 104), in this example LAP b, and then transmits (Step 106) the CF-Poll+Data+SIPS to LAP b. After LAP b transmits the acknowledgment, the GAP a determines that it has two more LAPs c and d to query (Step 108), and repeats the process (Steps 104, 106, and 108) until all three LAPs have been queried. At this time, the GAP a ends its role as a PC by sending a CF_End (Step 110).

Figure 12:
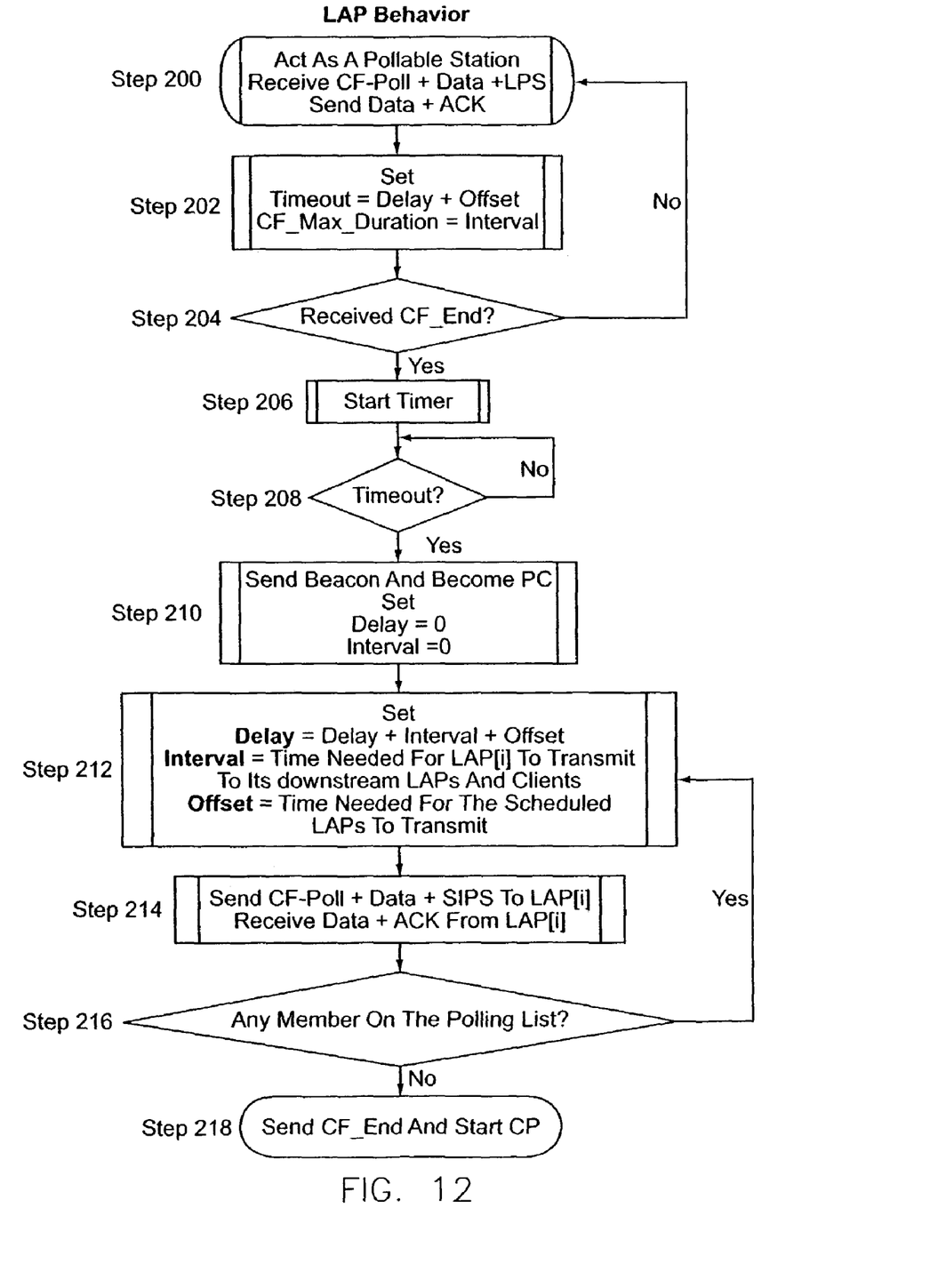
FIG. 12 is the flowchart for the communication protocol wherein each LAP, in turn and individually, functions as a PC utilizing the "CF–Poll+Data+SIPS" frame format.

During the time that the GAP a is functioning as the PC, the individual LAPs b, c, d, e, f, and g monitor for messages from the functioning PC, in this case the GAP a. Focusing first on the actions of LAP b in the flowchart of FIG. 12, the individual LAP does nothing until it is polled by the GAP a and when it receives the CF-Poll+Data+SIPS corresponding with its address, it replies with the appropriate data and an acknowledgment (Step 200). It will continue to use the information from the SIPS portion of the message to set the parameters within its software routines making the timeout equal to the delay bb plus the offset aa values and the CF_Max_Duration equal to the interval cc value (Step 202). If the CF_End has not been received (Step 204), then LAP b will continue to monitor and start the process over again (Step 200). When the CF_End has been received, then a timer will begin the countdown (Step 206) for the beginning of the PC mode for LAP b (Step 208). This timer times the DCF period.

Once the timer has expired, LAP b transmits a beacon signaling that it is the PC (Step 210), internally initializing the delay bb and interval cc values to zero and loading the values for its first client LAP, in this case LAP e (Step 212). This information will then be transmitted (Step 214) and acknowledged by LAP e. LAP b will then determine if there are any remaining client LAPs to poll (Step 216) and will repeat the cycle until all client LPs are polled. In this particular embodiment, only LAP f would remain. After LAP f is polled, LAP b will transmit the CF_End message (Step 218) indicating that its transmission period has ended. The time for transmission is predetermined and is included in the interval time cc. Since the timing is predetermined, the polling finishes on schedule. LAP c will begin the cycle as described in the flowchart illustrated in FIG. 12, thus LAP c waits until after LAP b finishes its communication cycle with its clients before proceeding, and LAP d subsequently waits until both LAP b and LAP c finish polling their clients.

When the transmission time frame is properly bounded, no AP should collide or interfere with any other AP. The protocol disclosed here ensures there is one PC utilizing the Point Coordination Function (PCF) at any given time. Referring to FIG. 8, the CF–Poll+Data+SIPS frame is similar to the IEEE 802.11 standard PCF frame. However, the difference in this system is that each client LAP polled with the CF–Poll+Data+SIPS frame, causes each client to subsequently transmit as a PC to their follow-on client LAPs at a time determined by the various values in the offset aa, delay bb and interval cc fields within the SIPS y.

In a second embodiment, we show another way to set the timing. For example, the GAP a will query LAP b then LAP c. However, the delay set for LAP c will allow the LAP b to poll all its clients. This embodiment is described in the flowchart of FIG. 13. The monitoring performed by the LAPs b, c, d, e, f, and g is the same as that in Steps 200-208 in FIG. 12. When the LAP b, c, d, e, f, or g begins functioning as a PC, the LAP transmits a beacon (Step 310) and initializes the elements (the offset aa, delay bb and interval cc) of the SIPS y field (Step 312). If it is assumed for this example that LAP b now functions as the PC, it then sets the appropriate values in the delay bb and interval cc fields (Step 314). It should be noted that the offset field aa remains initialized at zero.

Figure 13:
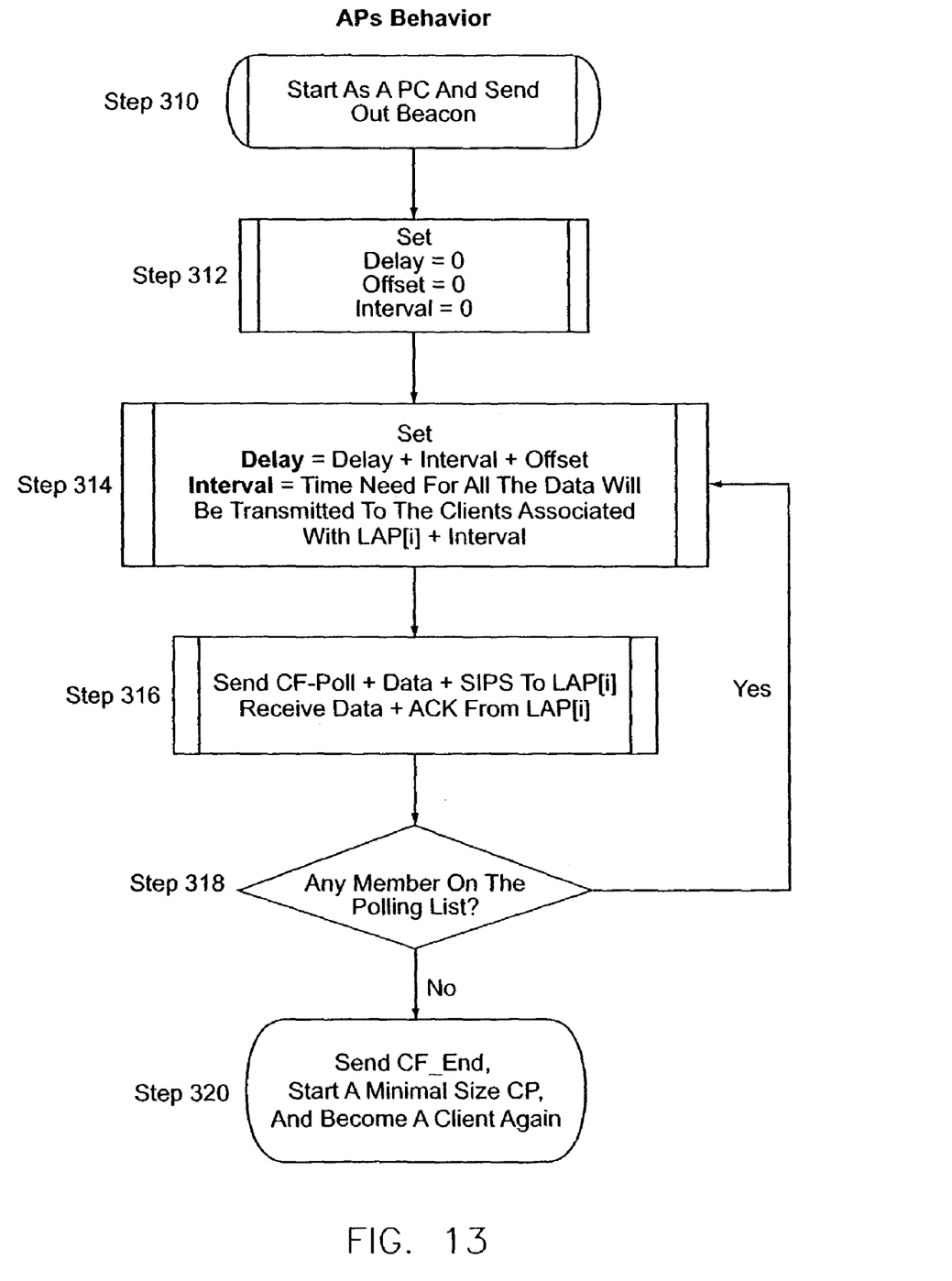
FIG. 13 is the flowchart illustrating an alternative scheduling embodiment wherein each LAP functions as a PC utilizing the "CF–Poll+Data+SIPS" frame format.

Further assuming the client being polled by LAP b in this example is LAP e then LAP f, the values in the delay bb and interval cc field set for f will allow enough time for LAP e to poll its clients. LAP b will then transmit the message frame in the format of a CF–Poll+Data+SIPS to LAP e with a delay value equal to 0, which means that LAP e will start acting as the PC without delay after receiving CF_END. Lap b will receive Data+ACK to complete this step (Step 316) and will pass through the decision block (Step 318) and poll the remaining member on the list, which in this case is LAP f. However, the values in delay bb will make LAP f delay long enough so that LAP e will finish polling all of its clients. Then, LAP b transmits CF_End to end this cycle (step 320) and LAP e begins another cycle through steps 310 through 320.

The embodiments described can find applications for interactive media and voice communication systems as well as existing data networks. Hospital networks can take advantage of this system in order to interact with medical equipment adjusting remotely the parameters for intravenous units or heart units. Despite the differences between the IEEE 802.11 physical layer modes, such as Frequency Hopping Spread Spectrum, Direct Sequence Spread Spectrum and Infrared, they all use the common MAC layer standard, and the message frame format disclosed in this document can be used to support all of these modes. While various embodiments of the invention have been described, it will be apparent to those of ordinary skill in the art that more embodiments and implementations are possible within the scope of this invention.

We claim:

1. A wireless local area network (WLAN) protocol for supporting communications in a WLAN, the WLAN having a plurality of access points, the WLAN protocol comprising:
    at a first access point, assuming a role of a point coordinator (PC), and sending from a first one of the access points to a second access point a polling message including:
        a medium access control (MAC) header further comprising communication control information;
        a data block set further comprising informational data associated with the MAC header; and
        a scheduling information parameter set (SIPS) further comprising an offset field, a delay field and an interval field associated with the MAC header and the data block set;
    sending from the second access point an acknowledgement of receipt of the polling message; and
    at a second access point assuming the role of a point coordinator according to the SIPS included in the polling message.

2. A WLAN protocol as in claim 1, wherein the SIPS comprises timing information for the second access point to-determine a time at which the second access point may assume the role as PC.

3. A WLAN protocol as in claim 2, wherein the SIPS offset field contains a time value that reflects a time remaining for the first access point to continue as the PC.

4. A WLAN protocol as in claim 2, wherein the SIPS delay field contains a time value reflecting a time that the second access point may delay assuming the role of PC after the first access point terminates its role as PC.

5. A WLAN protocol as in claim 2, wherein the SIPS interval field contains a time value reflecting a durational time that first access point functions as the PC.

6. A WLAN protocol as in claim 1, wherein the access points transmit informational packets to mobile terminals within the WLAN.

7. A WLAN protocol as in claim 1, wherein the e protocol supports transmission of data packets containing real-time voice and interactive medium data.

8. A WLAN protocol as in claim 1, wherein the WLAN comprises a multi-hop wireless LAN.

9. A WLAN protocol as in claim 8, wherein the second access point further relays informational packets to mobile terminals within the multi-hop wireless LAN.

10. A WLAN protocol as in claim 9, wherein the protocol supports transmission of data packets containing real-time voice and interactive medium data.

11. A method of communicating in a wireless local area network (WLAN), wherein a gateway access point (GAP), fixed to a wired network, transmits informational packets while functioning as a point coordinator (PC) to client local area points (LAP) comprising the steps of:
    controlling communication with a medium access control (MAC) header;
    communicating data information in a data block associated with the MAC header; and
    scheduling the client LAPs to each function as the PC with a schedule information parameter set (SIPS) comprising an offset field, a delay field and an interval field associated with the MAC header and the data block set.

12. A method as in claim 11, wherein the scheduling step comprises a step of providing a time value in the SIPS offset field that reflects a time remaining for an upstream LAP functioning as the PC to continue as the PC.

13. A method as in claim 11, wherein the scheduling step comprises a step of providing a time value in the SIPS delay field that reflects a time that the client LAP delays functioning as the PC after the upstream LAP functioning as the PC terminates the PC function.

14. A method as in claim 11, wherein the scheduling step comprises a step of providing a time value in the SIPS interval field that reflects the durational time that the client LAP functions as the PC.

15. A method as in claim 11, wherein the LAPs transmit informational packets to mobile terminals within the WLAN.

16. A method as in claim 11, wherein said communicating step provides real-time voice and interactive medium data.

17. A method as in claim 11, wherein the client LAP functions as the PC, further relaying informational packets to downstream LAPs in a multi-hop wireless LAN comprising the steps of:
  controlling a communication with a medium access control (MAC) header;
  communicating data information in the data block associated with the MAC header; and
  scheduling the client LAPs function as the PC with the schedule information parameter set (SIPS) comprising an offset field, a delay field and an interval field associated with the MAC header and the data block set.

18. A method as in claim 17, wherein the scheduling step comprises a step of providing a time value in the SIPS offset field that reflects a time remaining for an upstream LAP functioning as the PC to continue as the PC.

19. A method as in claim 17, wherein the scheduling step comprises a step of providing a time value in the SIPS delay field that reflects a time that the client LAP delays functioning as the PC after the upstream LAP functioning as the PC terminates the PC function.

20. A method as in claim 17, wherein the scheduling step comprises a step of providing a time value in the SIPS interval field that reflects the durational time that the client LAP functions as the PC.

21. A method as in claim 17, wherein the LAPs transmit informational packets to mobile terminals within the WLAN.

22. A method as in claim 17, wherein said communicating step provides real-time voice and interactive medium data.

* * * * *